(12) United States Patent
Kennedy

(10) Patent No.: US 10,682,590 B2
(45) Date of Patent: *Jun. 16, 2020

(54) MIXED DENSITY FLUID SEPARATOR

(71) Applicant: Pacific Petroleum Recovery Alaska, LLC, Anchorage, AK (US)

(72) Inventor: Kevin Kennedy, Anchorage, AK (US)

(73) Assignee: Pacific Petroleum Recovery Alaska, LLC, Anchorage, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,397

(22) Filed: May 15, 2018

(65) Prior Publication Data
US 2018/0326325 A1    Nov. 15, 2018

Related U.S. Application Data

(60) Provisional application No. 62/506,568, filed on May 15, 2017.

(51) Int. Cl.
| | | |
|---|---|---|
| *C02F 1/40* | (2006.01) | |
| *B01D 17/032* | (2006.01) | |
| *B01D 17/02* | (2006.01) | |
| *B01D 17/12* | (2006.01) | |
| *C02F 101/32* | (2006.01) | |

(52) U.S. Cl.
CPC ..... *B01D 17/0205* (2013.01); *B01D 17/0214* (2013.01); *B01D 17/12* (2013.01); *C02F 1/40* (2013.01); *C02F 2101/32* (2013.01); *C02F 2201/005* (2013.01)

(58) Field of Classification Search
CPC ................................. B01D 17/0208; B01D 17/0214; B01D 17/12; C02F 1/40; C02F 2201/005
USPC ........ 210/800, 104, 121, 123, 533, 539, 540
See application file for complete search history.

(56) References Cited

U.S. PATENT DOCUMENTS

| | | | |
|---|---|---|---|
| 2,980,294 A | 4/1961 | Sacco | |
| 3,385,440 A | 5/1968 | Ray | |
| 4,055,499 A * | 10/1977 | Laxo | B01D 17/0214 |
| | | | 210/533 |
| 4,057,364 A | 11/1977 | Bratschitsch | |
| 4,064,054 A | 12/1977 | Anderson | |
| 4,123,365 A | 10/1978 | Middlebeek | |
| 4,346,731 A | 8/1982 | Sigworth | |

(Continued)

FOREIGN PATENT DOCUMENTS

| | | | |
|---|---|---|---|
| DE | 4119549 | * | 2/1992 |
| WO | 2016209724 A1 | | 12/2016 |

*Primary Examiner* — Christopher Upton
(74) *Attorney, Agent, or Firm* — James A. Bradburne

(57) ABSTRACT

A mixed density fluid separator and systems for separating fluids of different densities, as well as kits and methods employing the same, are provided. The mixed density fluid separator generally comprises a fluid separation tank having a valve control system and a vacuum pump to direct fluid processing. The tank includes an upper float ball valve having a neutrally buoyant float ball slideably retained therein by a vertically elongated guide cage that is at least twice as long as the diameter of the float ball. The mixed density fluid separator can be adapted for multiple different uses, including with rapid deployment oil-spill cleanup kits that are sufficiently lightweight and compact for easy transport, access and application.

15 Claims, 5 Drawing Sheets

(56) References Cited

U.S. PATENT DOCUMENTS

| | | | |
|---|---|---|---|
| 4,436,630 A * | 3/1984 | Anderson | B01D 17/0214 |
| | | | 210/119 |
| 4,463,597 A | 8/1984 | Pierce | |
| 4,691,407 A | 9/1987 | Sloan | |
| 4,778,595 A * | 10/1988 | Sable | B01D 36/001 |
| | | | 210/123 |
| 4,865,070 A | 9/1989 | Delwiche | |
| 5,073,266 A * | 12/1991 | Ball, IV | B01D 17/00 |
| | | | 210/540 |
| 5,265,653 A | 11/1993 | Herlth | |
| 5,492,144 A | 2/1996 | Kriewaldt | |
| 5,587,065 A * | 12/1996 | Burns | B01D 17/12 |
| | | | 210/104 |
| 5,922,064 A * | 7/1999 | Gordon, Sr. | B01D 17/0214 |
| | | | 210/540 |
| 6,058,949 A | 5/2000 | Engle | |
| 6,129,839 A * | 10/2000 | Mains, Jr. | B01D 17/0211 |
| | | | 210/540 |
| 6,413,435 B1 * | 7/2002 | Kyles | B01D 17/0214 |
| | | | 210/800 |
| 7,297,284 B2 * | 11/2007 | Owen | B01D 17/0214 |
| | | | 210/800 |
| 7,611,635 B2 | 11/2009 | Chieng | |
| 8,763,455 B1 | 7/2014 | Chang | |
| 10,029,190 B2 * | 7/2018 | Kennedy | B01D 17/0214 |
| 2016/0367912 A1 | 12/2016 | Kennedy | |

* cited by examiner

MIXED DENSITY FLUID SEPARATOR

INTRODUCTION

FIELD

The field of the disclosure relates generally to devices and processes for separating fluids of different densities, such as oil and water.

BACKGROUND

Fluid mixtures can often be separated from one another based on differences in density (specific gravity). In many instances the separations can occur by just allowing the fluids to partition on their own in a calm, non-mixing setting. However, this typically takes time and is not very practical for many commercial applications. Centrifugation can speed up the process but is difficult and expensive to scale. Each system has its own set of drawbacks, almost all of which exhibit performance issues when deployed under less than ideal situations.

Efficiency and performance reliability is particularly important when dealing with hazardous fluids under environmental conditions, such as with oil spill response and cleanup. Unfortunately, turbulence and choppy conditions are one of the bigger problems as it not only tends to further mix the fluids one is attempting to separate, but also places additional burdens on operator safety and machinery. For example, fluids to be separated are often themselves quite hazardous to deal with and can have a complex range of properties that shorten the service life of sensors, valve systems and controls at best. Variations in fluid mixtures, environmental conditions and other demands can further undermine performance.

There is a clear need for improved products and methods for separating fluids of different densities, such as processing water and/or sediment laden with oil and other lighter-than water fluids. A particular need exists for rapid response oil recovery systems, which should be compact, simple to deploy, robust, reliable, and process large volume flow rates among other things while avoiding poor separation performance in multiple different environments. The present disclosure addresses these and other needs.

REFERENCES

Different types of equipment for responding to oil spills is disclosed in, for example, Oil Spill Science and Technology: Prevention, Response, and Cleanup. 2010, Ed. Mervin Fingas, Elsevier.

Various references disclose vacuum pumps and valve systems for processing and handling different types of fluids. For example, U.S. Pat. No. 4,691,407 discloses an apparatus for recovering liquids such as drilling mud. U.S. Pat. No. 5,265,653 discloses an apparatus for draining fluids from engines, automobiles, boats, tractors, and the like. U.S. Pat. No. 5,492,144 discloses a device for draining fluids from salvage vehicles. U.S. Pat. No. 2,980,294 discloses an apparatus for delivering liquid such as gasoline. U.S. Pat. No. 4,057,364 discloses fluid transfer systems fluid transfer system for handling contaminated and/or corrosive liquids. U.S. Pat. No. 6,058,949 discloses a vacuum transfer system for food grade product.

Fluid processing based on floats or plugs that float in one fluid and sink in another are referenced by, for example, U.S. Pat. No. 3,385,440. U.S. Pat. No. 4,463,597 discloses an apparatus for testing a pipeline employing neutrally buoyant spherical plug. U.S. Pat. No. 4,865,070 discloses a scupper device using a variable density plug. U.S. Pat. No. 8,763,455 discloses a temperature and fluid level sensing device with displacement floats. U.S. Pat. No. 4,346,731 discloses a buoyant element check valve.

BRIEF SUMMARY

The present disclosure provides a mixed density fluid separator useful for separating fluids of different densities, as well as methods, kits and systems employing the same. The subject apparatus is particularly useful for separating fluids such as oil and water, oil and sediment, water and sediment and the like, and more particularly in industrial or emergency response applications as part of skimmer systems for cleaning up oil spills in open bodies of water and coastal environments.

In one embodiment, the fluid separator includes:

(i) a fluid separation tank having upper and lower portions relative to waterline defining a substantially sealed enclosure for containing a fluid therein;

(ii) an oil-water main feeding the tank through an oil water inlet so as to define an oil-water flow path from outside to inside the tank;

(iii) a water outlet in the lower portion of the tank so as to define an water flow path from inside to outside the tank;

(iv) an air inlet in gaseous communication with the upper portion of the tank so as to define an air flow path from outside to inside the tank;

(v) an oil outlet in the upper portion of the tank so as to define an oil flow path from inside the tank to outside the tank; and (vi) a valve system for regulating the oil-water flow path, the water flow path, the air flow path, and the oil flow path, the valve system having first and second valve settings:

the first valve setting (a) to open the oil-water flow path of the oil-water inlet and the oil flow path of the oil outlet, and to close the air flow path of the air inlet and the water flow path of the water outlet, the second valve setting (b) to close the oil-water flow path of the oil-water inlet and the oil flow path of the oil outlet, and to open the air flow path of the air inlet and the water flow path of the water outlet;

wherein the oil flow path is regulated in part by an upper float ball valve to direct flow of a first fluid out of the fluid separation tank when open and prevent backflow when closed, the upper float ball valve positioned in the upper portion of the fluid separation tank and comprising as components:

an upper float ball slideably retained by a vertically elongated upper guide cage relative to waterline, the upper float ball selected to be neutrally to negatively buoyant in a fluid to be discharged outside the tank from the oil outlet, and positively buoyant in a fluid to be discharged outside the tank from the water outlet, and the upper guide cage having guide rails attachably arranged so as to define a float ball movement path having a portion that is fully exposed on all sides to surrounding fluid within the tank and substantially impediment free except for guide rail contacts, the fully exposed portion of the upper guide cage at least twice as long as the diameter of the upper float ball.

The methods include applying the subject mixed density fluid separator of the disclosure in a process to separate mixed density fluids. In one embodiment, a method is provided that comprises: (i) supplying a fluid mixture to the oil-water main of a subject mixed density fluid separator of the disclosure in valve setting (a); (ii) applying a partial vacuum to the oil outlet to withdraw fluid therefrom; and (iii) alternating valve settings (a) and (b).

The kits of the disclosure include the subject mixed density fluid separator, particularly as a kit for rapid deployment and oil-spill recovery. In one embodiment, the kit comprises a mixed density fluid separator of the disclosure stored in a transportable container, and optionally, one or more of the following components: oil boom, wing net, line, hose, vacuum pump, flotation platform, advancing skimmer head, and product recovery tank.

DESCRIPTION OF SPECIFIC EMBODIMENTS

Figure 1:
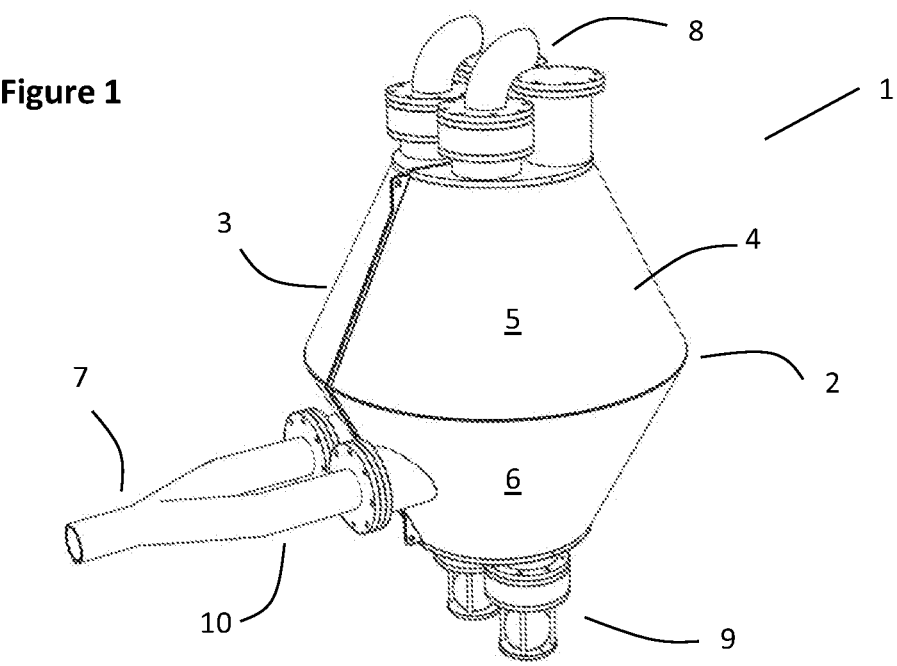
FIG. 1 is a perspective view of a mixed density fluid separator of the disclosure.

As summarized above, the present disclosure is directed to a mixed density fluid separator, as well as methods of use and systems and kits employing the same.

The mixed density fluid separator generally comprises a fluid separation tank having upper and lower portions relative to waterline defining a substantially sealed enclosure for containing a fluid therein. The fluid separation tank includes an oil-water main feeding the tank through an oil-water inlet, an air inlet, and an oil outlet regulated in part by an upper float ball valve positioned in an upper portion of the tank. In normal operation the upper float ball valve is in fluid communication with a vacuum pump. The vacuum pump is configured and positioned so as to withdraw fluid from inside the tank to outside the tank through the upper float ball valve when the float ball valve is open. The upper float ball valve includes an upper float ball slideably retained by a vertically elongated upper guide cage relative to waterline. The upper float ball is selected to be neutrally to negatively buoyant in a fluid to be discharged outside the tank from the oil outlet, and positively buoyant in a fluid to be discharged outside the tank from the water outlet. The upper guide cage includes guide rails arranged to define a float ball movement path having a portion that is fully exposed on all sides to surrounding fluid within the tank and substantially impediment free except for guide rail contacts, the fully exposed portion of the upper guide cage at least two times as long as the diameter of the upper float ball.

While the subject disclosure refers to oil and water separation by way of example, including referring to various components of the mixed density fluid separator as oil inlet, oil outlet, water outlet and so forth, it is to be understood that the disclosure is not limited to the separation of oil and water, and finds use in processing a wide range of mixed density fluids in general, including, but not limited to, materials behaving as fluids and tendering to separate based on different densities such many immiscible fluids including hydrocarbons and water in general, hydrocarbon laden sediment, water and sediment, flotsam, and so forth.

Before the subject disclosure is described further, it is to be understood that the disclosure is not limited to the particular embodiments described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims. In addition, many modifications may be made to adapt a particular situation, material, composition of matter, process, process step or steps, to the objective, spirit and scope of the present invention. All such modifications are intended to be within the scope of the claims made herein.

In this specification and the appended claims, the singular forms "a," "an" and "the" include plural reference unless the context clearly dictates otherwise. Conversely, it is contemplated that the claims may be so-drafted to exclude any optional element. This statement is intended to serve as antecedent basis for use of such exclusive terminology as "solely," "only" and the like in connection with the recitation of claim elements or by use of a "negative" limitation.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the invention. Also, it is contemplated that any optional feature of the inventive variations described herein may be set forth and claimed independently, or in combination with any one or more of the features described herein.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the disclosure, the preferred methods, devices and materials are now described.

All existing subject matter mentioned herein (e.g., publications, patents, patent applications and hardware) is incorporated by reference herein in its entirety. The referenced items are provided solely for their disclosure prior to the filing date of the present application. Nothing herein is to be construed as an admission that the present disclosure is not entitled to antedate such material by virtue of prior invention.

In further describing the subject apparatus, the mixed fluid separator is described first in greater detail, followed by a detailed description of exemplary embodiments, and then a review of various kits and deployment systems that may find use with the subject mixed fluid separator, as well as a discussion of various representative applications and advantages thereof.

Mixed Density Fluid Separator

As noted above, the mixed density fluid separator generally comprises a fluid separation tank having upper and lower portions relative to waterline defining a substantially sealed enclosure for containing a fluid therein. As also noted above, the separator tank generally includes an upper float ball valve having a float ball that is (i) neutrally buoyant in a fluid selected for separation, and (ii) slideably retained therein by a vertically elongated guide cage that is at least twice as long as the diameter of the float ball, and more generally at least three times as long as the diameter of the neutrally buoyant selected float ball.

More specifically, the mixed density fluid separator includes a fluid separation tank comprising: (i) an oil-water main feeding the tank through an oil water inlet so as to define an oil-water flow path from outside to inside the tank; (ii) a water outlet in the lower portion of the tank so as to define an water flow path from inside to outside the tank; (iii) an air inlet in gaseous communication with the upper portion of the tank so as to define an air flow path from outside to inside the tank; and (iv) an oil outlet in the upper portion of the tank so as to define an oil flow path from inside the tank to outside the tank.

The mixed density fluid separator further includes a valve system for regulating the oil-water flow path, the water flow path, the air flow path, and the oil flow path. The valve system includes first and second valve settings: the first valve setting (a) to open the oil-water flow path of the oil-water inlet and the oil flow path of the oil outlet, and to close the air flow path of the air inlet and the water flow path of the water outlet, and the second valve setting (b) to close the oil-water flow path of the oil-water inlet and the oil flow path of the oil outlet, and to open the air flow path of the air inlet and the water flow path of the water outlet.

A featured aspect is where the oil flow path is regulated in part by an upper float ball valve to direct flow of a first fluid out of the tank when open and prevent backflow when closed. The upper float ball valve in this embodiment is positioned in the upper portion of the tank and comprises as components: (i) an upper float ball slideably retained by (ii) a vertically elongated upper guide cage relative to waterline feeding the upper float ball to (iii) an upper float ball valve seat having a central passage therethrough and configured for reversibly and sealably receiving the upper float ball therein.

By "relative to waterline" is intended the level typically reached by water on the side of the apparatus when placed in normal operation in an open body of water.

In one embodiment, the guide cage comprises guide rails attachably arranged to create a defined movement path for the float ball. In general, the guide rails of the upper float ball valve are evenly spaced. Also, a minimal number of guide rails are typically used so as to minimize friction between the float ball and the guide rails. For example, while other shapes are possible, the preferred float balls of the disclosure are spherical, and thus without piercing or deforming the float ball with tracks, the minimum number of vertically elongated guide rails needed to slidable retain a spherical float ball therein is three. Accordingly, in one embodiment the mixed density fluid separator includes three or more guide rails, and more typically four guide rails.

The upper float ball guide cage also generally includes first and second ends. The first end is fitted with the upper float ball valve seat and oriented so that the valve seat face is perpendicular to the flow path direction when placed in normal operation. The first end, such as being perpendicular to guide rails attachably arranged thereto so as to define a vertical float ball movement path relative to waterline. The second end includes a stop member so as to prevent the float ball from falling out the bottom of the cage when placed in normal operation. The second end stop member is typically a disk having a central passage to allow fluid to pass freely therethrough, with guide rails attached thereto in a perpendicular manner relative to the flat plane of to the disk. In certain embodiments, the float ball valve seat is sandwiched in between a stop member on the first end of the guide cage and a fitting for adapting the valve through a surface, such as a annular flange member to provide attachment point and an opening through which the guide cage passes.

In as many embodiments, the upper float ball is selected to be neutrally to negatively buoyant in a fluid to be discharged outside the tank from the oil outlet, and positively buoyant in a fluid to be discharged outside the tank from the water outlet.

By "neutral buoyancy" is intended a condition in which a physical body's average density is equal to the density of the fluid in which it is immersed. By "negative buoyancy" is intended a condition in which a physical body's average density is greater than the density of the fluid in which it is immersed. By "positive buoyancy" is intended a condition in which a physical body's average density is less than the density of the fluid in which it is immersed.

Under normal operating conditions flow enters the bottom of the upper float ball valve and passes upwardly through the float ball valve seat. The upper float ball valve is thus oriented perpendicular to waterline so that the float rises within the guide cage along with a rising fluid level in which the float ball experiences a positive buoyancy. The guide rails being vertically elongated and generally perpendicular to waterline restrict the float ball to a vertical flotation path. If the fluid level in which the float ball experiences a positive buoyancy continues to rise, the float ball will eventually engage and sealably sit within the float ball valve seat, thereby blocking the central passage therethrough and shutting the valve off to fluid flow through the central passage. If the fluid level in which the float ball experiences a neutral to negative buoyancy continues to rise, the float ball will tend not to engage the float ball valve seat, thereby keeping the central passage therethrough open and allowing fluid flow through the central passage.

In certain embodiments, a float ball with a pre-selected density is provided for the upper float ball valve, with the proviso that the float ball is shaped and sized so as to be slideably retained by the guide cage and capable of reversibly and sealably engaging the upper float ball valve seat. Of particular interest is where the float ball is a buoyancy adjustable float ball. A specific buoyancy adjustable float ball is one having a hollow core and a reversibly sealable access port to the core therein so that it can be filled with a fluid to be separated. For example, when a mixed density fluid separator of the disclosure is employed to separate oil from water, a buoyancy adjustable float ball filled with the oil can be employed in the upper float ball valve.

As noted above, in certain embodiments the upper guide cage includes guide rails arranged to define a float ball movement path having a portion that is fully exposed on all sides to surrounding fluid within the tank and substantially impediment free except for guide rail contacts. Thus, by "fully exposed portion" is intended that part of the guide cage in which only the guide rails separate the float ball from the bulk of the surrounding fluid. By "guide rails" is intended a series of bars arranged to direct an object through a channel defined by the guide rails.

A featured aspect of the upper float ball valve is that the length of the fully exposed portion of its guide cage is at least twice that of the float ball diameter. Specifically, the length of the fully exposed portion of the guide cage is in general at least two to three times the length of the float ball diameter, and more typically, at least three times the length of the float ball diameter. The upper guide cage length aspect is important as shorter arrangements for the upper float ball valve do not work properly, especially in chopping conditions. In addition to guide cage length, use of guide rails in concert with a neutrally buoyant float ball provides reduced friction while exposing the float ball to the surrounding fluid, as well as excellent durability and performance under harsh conditions and the vacuum forces necessary to pull and process large volume of fluid through the system.

In certain embodiments, the mixed density fluid separator is continuous flow mixed fluid separator comprising at least two fluid separator tanks. A specific example is one that employs at least two of the subject fluid separation tanks described above and capable of operating in opposing but synergistic separation modes in parallel to process a common mixed fluid density stream in a continuous flow manner. For example, a dual tank separator of this nature is illustrated in Figures.

Briefly, the multi-tank mixed density fluid separator includes the oil-water main feeding an oil-water manifold having a first distribution branch feeding a first fluid separation tank of the disclosure, and a second distribution branch feeding a second fluid separation tank of the disclosure. Each of the first and second fluid separation tanks are fluidly sealed and include an oil-water inlet, an oil outlet, an air inlet, and a water outlet. The oil-water inlet and water outlet are located in a lower portion, while the oil outlet and air inlet are located in an upper portion of each tank. The distribution branches are in fluid communication with and feed the oil-water inlets. The multi-tank fluid separator also includes a plurality of valves to regulate the flow paths of the inlets and outlets in concert. The multi-tank oil-water separator further includes a valve control system to control the opening and closing of the valves and alternate opposing valve settings between the tanks.

In general, the first and second fluid separation tanks each include two basic valve settings as described above. In the first setting, the flow paths of the oil-water inlet and oil outlet are open, and the flow paths of the air inlet and water outlet are closed. In the second setting, the flow paths of the oil-water inlet and oil outlet are closed, and the flow paths of the air inlet and water outlet are open.

In operation one of the fluid separation tanks is set to the first valve setting, and another fluid separation tank is set to the second valve setting. The valve control system is utilized to alternate these settings between the tanks such that when one tank is one valve setting, the other tank is in the opposite valve setting.

By way of example, when placed in normal operation to clean up and oil spill, the multi-tank fluid separator is attached to the oil-water outlet of a skimmer head to collect and feed a mixed density fluid stream to the oil-water main. A vacuum or similar pump is attached and in fluid communication with each oil outlet of each oil separation tank to apply a partial vacuum thereto and withdraw fluid therefrom, depending on the valve settings. The multi-tank fluid separator when deployed is positioned upright in the flotation platform in a body of water such that the water outlets are below and the air inlets above waterline, the mixed density fluid is supplied to the oil-water main, and the pump turned on so as to apply a partial vacuum to oil outlet of the oil-separation tank having the first valve setting. Application of the partial vacuum to the oil separation tank having the first valve setting draws the mixed density fluid into this tank from the oil-water main, placing the tank in active processing mode. At the same time, the partial vacuum source to the other tank in the second valve setting is turned off or blocked, blocking the inflow of the mixed density fluid into this tank, and placing the tank in passive processing mode. The valve control system is utilized to alternate the first and second valve settings to switch the tanks back and forth between active and passive processing modes to process the incoming mixed density fluid stream in a continuous manner.

Various valves, valve controllers, circuits, and computers suitable for a mixed density fluid separator described herein can be employed. Of particular interest are valve control systems such as disclosed in U.S. patent application Ser. No. 15/185,414, filed Jun. 17, 2016, which application is incorporated herein in its entirety.

For example, control of the apparatus can be remote or local, manual or automated, or any combination thereof. A programmable valve controller controlling is preferred. One or more on-board sensors, such as fluid sensor, proximity sensor, pressure sensor, camera and the like are particularly useful for these purposes. For example, a pressure sensor to detect pressure changes in a vacuum line to detect when a valve opens or closes, such as an upper tank float ball valve. Another example is a live camera-feed that can be used to view the collection process in real time, and the operator can adjust the apparatus accordingly. Another example is where various chemical or physical sensors are employed to notify a user to adjust an actuator, and/or instruct the actuator through a controller unit do so automatically. Of specific interest is where a wireless device is used to control one or more of these aspects remotely, and a local power source such as a battery is used to power the system.

In general, the apparatus when placed in normal operation is advanced through a body of fluid by towing or self-propulsion, or when a fluid stream is otherwise fed into the apparatus in plane with waterline when the apparatus is stationary or anchored relative to fluid flow. As such, the mixed fluid separator is typically attached to various additional components when placed in normal operation. This includes those components that are built in, mounted thereto, and so forth. For example, when deployed to collect surface water contaminants such as an oil slick, the mixed density fluid separator is attached to a skimmer head or other fluid collection device. In addition, the fluid separator is attached through its oil outlet line to a pump, such as a vacuum pump. The vacuum is used to draw fluid collected by the device into a trap system such as a storage tank or bag as part of a trap and so forth.

In addition, the mixed density fluid separator is typically attached to a rigid flotation platform when placed into a body of water, as well as forward wings to channel a fluid stream into the system when needed. Examples of various flotation platforms include, but are not limited to, rigid or inflatable pontoons or floats, bladders, a hulled boat or any suitable vessel capable of supporting and positioning the apparatus in a body of fluid to be skimmed. Of particular interest are pontoons placed on either side of a skimmer head mounted with extension bars for added horizontal stability. The pontoons may include a ballast system for adjusting and maintaining the desired position of the above and below waterline components when in operation. The buoyancy platform can be towed, anchored, self-propelled, or a combination thereof.

The mixed density fluid separator and its components can be composed of various materials, including, but not limited to, metal, plastic, rubber, composites and many other materials with the proviso the materials are sufficiently strong enough to withstand fluid flows and resistant to the fluids to be processed, particularly oil-resistant sheet metal, alloys and the like, such as aluminum, corrosion resistant steel and the like. The tank portions are preferably constructed of rigid material(s) and framing such as metal. Aluminum materials are particularly sturdy, lightweight, and corrosion resistant. With respect to surfaces, the individual top, side wall and floor portions can include various surface features such as curvatures, grooves, dimples and the like, but a generally flat surface is more common.

A featured aspect is where the mixed density fluid separator of the disclosure is attached to and in fluid communication with an advancing oil skimmer head. Generally, the mixed density fluid separator is attached to the advancing oil skimmer head by coupling the oil water main to an oil-water outlet of the skimmer head. The oil-water main is usually a rigid or flexible pipe, and typically a flexible hose, or combinations thereof, such as sections of flexible hose and rigid pipe.

A skimmer head of particular interest is an advancing skimmer head disclosed in U.S. Provisional Application No. 62/351,437, filed of Jun. 17, 2016, which is incorporated in its entirety herein. Briefly, the advancing skimmer head generally comprises an inner skimmer head compactly inserted and vertically slidable within an outer skimmer head relative to waterline. The inner and outer heads each individually include (i) a normally vertical mouth at a forward end having above and below waterline portions for receiving and feeding a normally horizontal fluid stream to (ii) a horizontally narrowing internal channel tapering aftward over a below waterline drain in fluid communication with the mouth. The forward and aft ends of the inner and outer heads are in alignment so that the inner and outer heads are facing the same direction. The inner head is dimensionally sized and sealably slidable in the vertical direction within the outer head so that the inner head receives an upper layer of fluid from the fluid stream while the outer head receives a lower layer of fluid from the fluid stream. The inner head drain is in fluid communication with a skimmer head oil-water outlet below the inner head drain so that the upper layer is directed and discharges to the skimmer head oil-water outlet, while the outer head drain is in fluid communication with the fluid stream aft of the inner head mouth so that the lower layer is directed and discharges back into the fluid stream aft of the outer head mouth. The inner head is attached to the outer head through a vertical actuator to slide the inner head up and down within the outer head relative to waterline so as to place the inner head in a position within the outer head to collect the upper layer of fluid from the fluid stream and direct the layer to the skimmer head oil-water outlet.

In many embodiments, the mixed density fluid separator is modular in that one or more parts thereof can be assembled and disassembled for storage, reassembly, replacement and the like. For example, in some embodiments, removable valves, sensors, the skimmer head and auxiliary components can be removed for storage, maintenance, shipping and the like. The wing attachments such as floating oil boom, wing nets, and the like is an additional example. Hose, hose couplers, extenders, rope/line, chain, floats, pumps, jacks, trolleys, holding tanks, pontoons, framing and the like are further examples.

Thus the mixed density fluid separator can be adapted in multiple configurations and for multiple different uses, including rapid deployment cleanup kits that are sufficiently lightweight and compact for transport by a wide range of vehicles. Smaller and larger versions are possible, as the system is readily scalable.

Referring to the drawings, as detailed below and in FIG. 1 through FIG. 14, an exemplary mixed density separator and components for lighter-than-water product recovery is illustrated. It will be appreciated, however, that the design of the exemplified embodiments are applicable to other devices, systems and methods and not intended to be limiting. For example, described in greater detail below, the mixed density fluid separator illustrated in some of the Figures employ two mixed density fluid separator tanks operating together to receive and process a single mixed density fluid stream in a continuous flow manner. It will be appreciated that single tank as well as multi-tank systems are possible. Referring to the drawings in detail, wherein like numbers designate like parts, several features are illustrated.

FIG. 1 illustrates certain aspects of mixed density separator of the disclosure from a perspective view. Waterline 2 is shown for reference to normally submerged and abovewater components when under operation. Mixed density separator 1 includes fluid separation tanks 3 and 4 each individually having upper 5 and lower portions 6 relative to waterline 2 defining a substantially sealed enclosure for containing a fluid therein. The valve system defines the various fluid paths into and out of a given tank, and includes the flow paths passing though the oil-water main 7, oil-outlet 8, and water outlet 9. Note the oil-water distribution branch 10 that splits the main fluid stream feed flow path from main 7. Depending on the valve setting, the fluid stream supplied by the main is directed into either tank.

Figure 2:
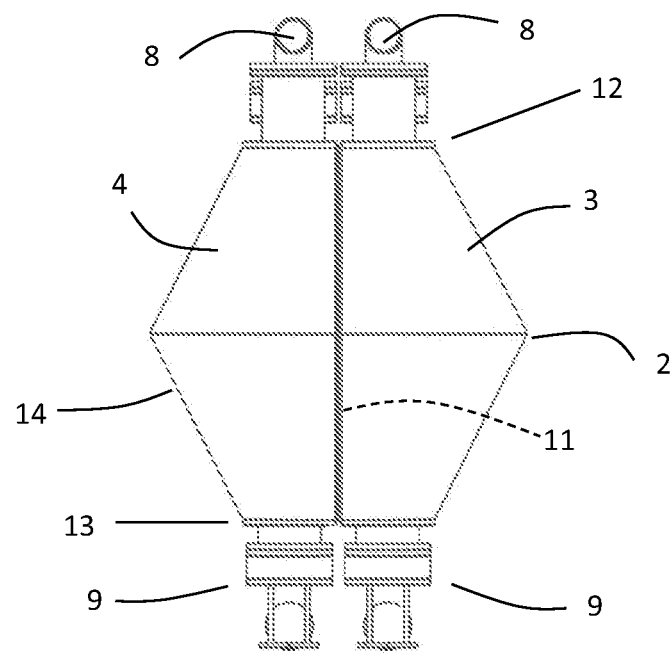
FIG. 2 shows a rear view of the fluid separator depicted in FIG. 1.

FIG. 2 shows a rear view of separator 1 and illustrates the dual tank nature of the fluid separator depicted in FIG. 1. As can be seen, vertically positioned partition 11 is essentially a liquid impervious plate that demarcates the separation line between individual tanks 3 and 4. Note that partition 11 represents an axis of symmetry between the two tanks such that tank 3 and tank 4 are in effect mirror images of one another. Structurally, partition 11 also provides a vertically elongated side wall shared by each tank 3 and 4 that connects top plate 12 and bottom plate 13. Not shown is a vertically elongated rigid stiffener attached to the partition so as to provide added strength and support to the system. Together with side wall 14, the central partition 11 along with the top and bottom plates 12 and 13 form the interior of a given fluid separation tank.

Figure 3:
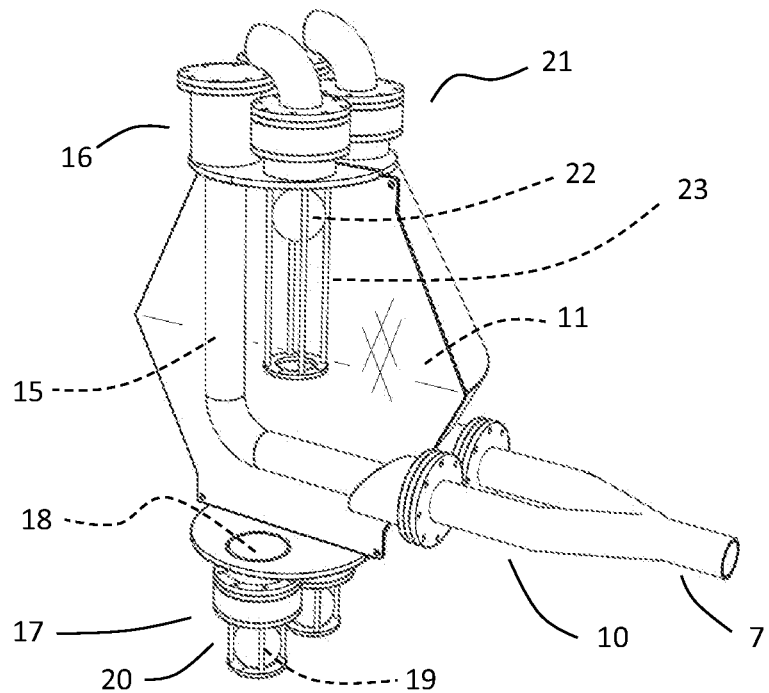
FIG. 3 shows a perspective view of a mixed density fluid separator of the disclosure, except with the side walls of one tank removed to show aspects of the interior.
Figure 4:
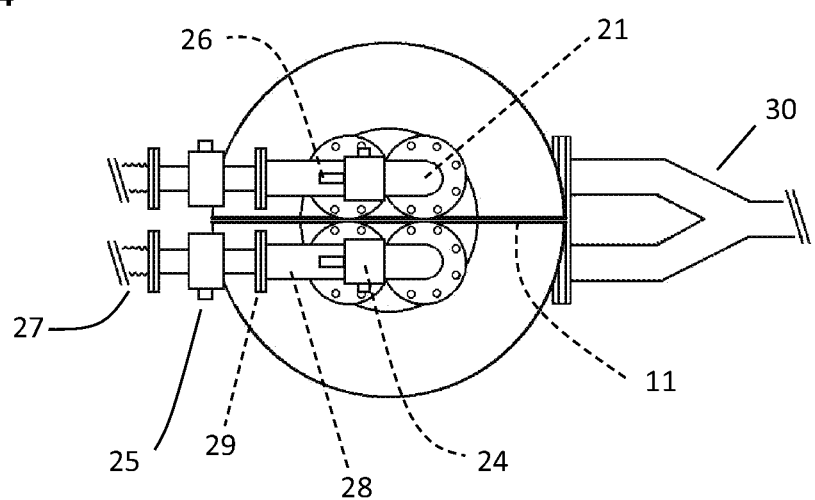
FIG. 4 shows a top down view of the fluid separator depicted in FIG. 1 fitted with vacuum hose, as well as air inlet, pressure sensor and vacuum valves.
Figure 5:
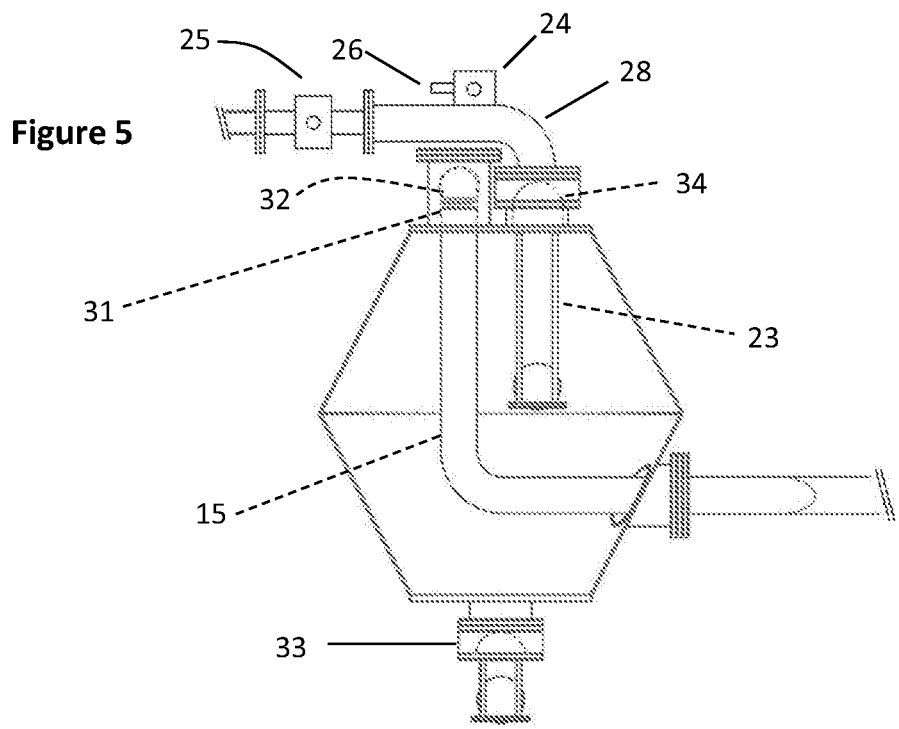
FIG. 5 shows a partially transparent side view of the fluid separator depicted in FIG. 4.

The valve system regulating fluid flow into and out of tanks 3 and 4 is shown in greater detail in FIGS. 3-8. FIG. 3 is a perspective view of the mixed density fluid separator depicted in FIG. 1, but with upper and lower side wall portions removed from one tank to provide a more detailed view of a given tank's interior. Note partition 12 separating the two tanks 3 and 4 from one another. As can be seen in FIG. 3, oil-water main 7 provides a fluid path that enters the tank through distribution branch 10. In this particular example, the distribution branch is normally in plane with waterline and connected through an elbow to a vertically oriented oil-water stack pipe 15 that discharges the mixed density fluid stream into the interior of the stack pipe housing 16 (the interior of the stack pipe housing is illustrated in FIG. 5). The stack pipe housing in this embodiment is closed to the exterior but open to the tank interior so as to direct the incoming mixed density fluid stream received from the oil-water main downward and into the interior of the tank below the top plate.

As a fluid stream discharges from the stack pipe and into the tank interior, the fluid can now take one of two paths depending on the valve settings. Note lower float ball valve 17 regulating fluid flow of water outlet 9. The water outlet includes water drain 18 defining a central passage through and feeding lower float ball valve 17. Note that lower float ball 19 is slideably retained in lower guide cage 20. Also note upper float ball valve 21 slideably retaining upper float ball 22. As with the lower float ball valve, a guide cage 23 that is vertically elongated relative to waterline is employed to retain and restrict float ball movement to vertical motion so as to define a specific float ball movement path. Note the evenly separated guide rails and stop ring member at the bottom of the guide cage. As shown in FIG. 3, the primary means for fluid to leave the tank once supplied by the oil-water main is through the upper and lower float ball valves.

Turning now to FIG. 4, this figure represents a top down view of the mixed density fluid separator depicted in FIG. 1 in which an air inlet valve 24, vacuum valve 25, pressure sensor 26 and vacuum hose 27 are provided for each of the fluid separation tanks 3 and 4. In normal operation and in reference to each tank individually, upper float ball valve 21 is in fluid communication with a vacuum pump through the oil flow path extending from the float ball valve to the pump (not shown). A portion of the oil flow path is shown in FIG. 4 in which a float ball valve pipe 28 is sealably adapted to float ball valve 21 and connected through a coupler 29 to a flexible vacuum hose 27. The oil flow path of this section of pipe as shown is regulated by three valves working in concert: the first is the float ball valve 21, the second is a vacuum valve 25, and the third is air inlet valve 24. As can be seen, the air inlet valve 24 is positioned between the upper float ball valve 21 and the vacuum valve 25. A pressure sensor 26 is depicted to sense the pressure in the float ball valve pipe 28 between upper float ball valve 21 and vacuum valve 25. FIG. 4 also provides a view of an oil-water manifold 30 connecting the oil-water main 7 to separate distribution branches 10 feeding tanks 3 and 4.

FIG. 5 provides a partially transparent side view of the mixed density fluid separator depicted in FIG. 4. As shown in FIG. 5, each stack pipe 15 feeds and discharges the fluid stream supplied by main 7 into a stack pipe housing 16. Each stack pipe 15 terminates above top plate 13 in an oil-water outlet 31 within the stack pipe housing so as to discharge the fluid stream into the interior of the tank. Note the flapper valve 32 adapted to and positioned at the oil-water outlet 31. As such, the stack pipe housing represents an extension of the upper portion of the tank in fluid communication with the lower portion of the tank. The stack pipe feature illustrated in this example is designed to process fluids burdened with debris, such a shoreline sediment and the like. In other embodiments, the stack pipe is replaced with a flap check valve; for example, a flap check valve can be positioned in a lower portion of the tank at or just below waterline. Note the supply and discharge routes for the lighter (e.g., oil) and heavier (e.g., water) fluids.

FIG. 5 also illustrates by way of the transparent view float ball valve seats for the upper and lower float ball valves. Note the lower float ball valve seat 33, and upper float ball valve seat 34. Both valve seats are configures to reversibly and sealably receive their respective float balls therein. Each float ball valve seat includes a central passage positioned therethrough to (1) allow fluid to freely pass therethrough when the float ball is disengaged from the seat, and (2) block fluid flow when the float ball is sealably seated within the valve seat. These later aspects are further illustrated in FIGS. 6-9.

Figure 6:
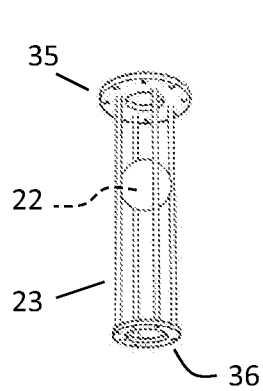
FIG. 6, FIG. 7, FIG. 8 and FIG. 9 depict assorted perspective views of a float ball valve associated components of the disclosure.

A featured aspect of the upper float ball valve is that the length of the fully exposed portion the guide cage is proportional to the float ball diameter. By "fully exposed portion" is intended the portion of the guide cage in which only the guide rails separate the float ball from the surrounding fluid. For example, and in general at least two to three times the length of the float ball diameter. As noted above, the FIGS. 6-9 depict various perspective views of the upper float ball valve 21 and its components. FIG. 6 shows upper float ball 22 slideably retained by upper float ball guide cage 23. The guide cage includes vertically elongated sides rails evenly spaced and connected perpendicular to an upper stop member 35 and a lower stop member 36. Note that the upper and lower stop members keep the side guide rails in position. Also note the central passage ways through each of the upper and lower stop elements that allow fluid to pass. It can also be seen that the side rails are sufficiently spaced as to fully expose the float ball to the surrounding fluid. The guide rails are also configured so as to exert a minimal amount of friction of the float ball. In this way the buoyancy of the float ball is influenced significantly by the surrounding fluid compared to the friction of the guide rail.

Figure 7:
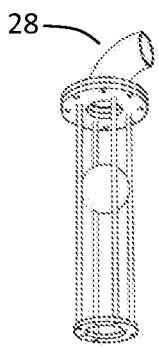

FIG. 7 illustrates a perspective views of portions of the upper float ball valve 21, and in particular the guide cage 23 connected through the upper stop member 35 to float ball valve pipe 28. Note that upper stop member 35 is sealably adjoined to valve pipe 28 in a manner so as to align the central passage and the pipe opening. In this way a substantially unhindered fluid channel is maintained from the exposed guide cage, through the central passage and into the valve pipe.

Figure 8:
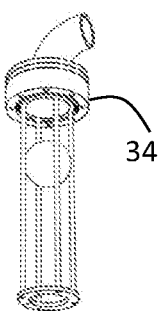

FIG. 8 depicts a perspective view of the float ball valve of FIG. 7, further including a float ball valve seat 34. The float ball valve seat also includes a central passage as noted above that allows fluid to pass therethrough unless the float ball engages and seals the passage. Basically, the float ball has a diameter larger than that of the central passage, so that when the float ball is seated in the float ball valve seat, the valve seat opening is shut closed by the ball.

Figure 9:
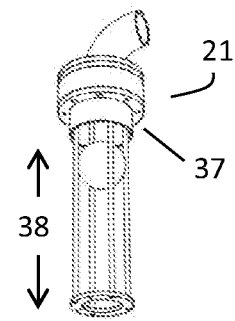

FIG. 9 depicts a perspective view of the float ball valve of FIG. 8, further including a valve seat clamp 37. This aspect provides a simple way to retain the float ball valve seat 34 in fixed position relative to the guide cage and the top plate of a given fluid separation tank.

Figure 10:
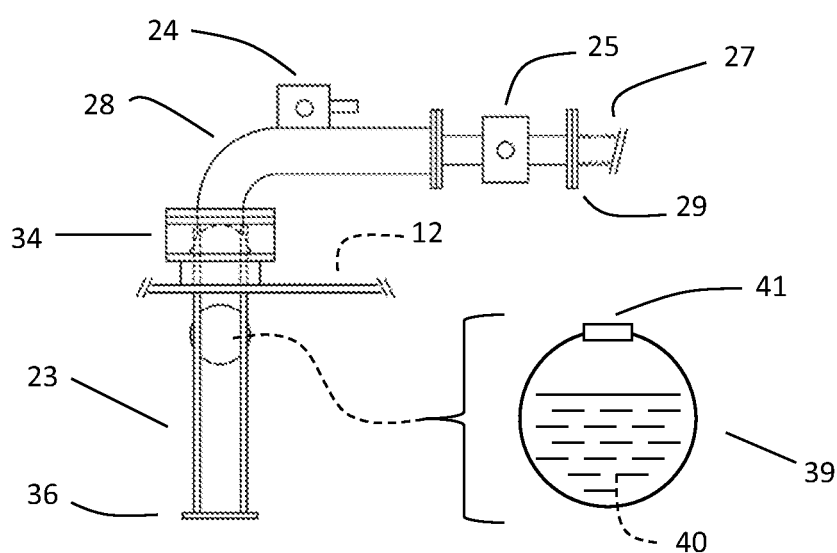
FIG. 10 depicts a side view of the float ball valve of FIG. 9 as adapted to a fluid separator of the disclosure fitted with vacuum hose, as well as air inlet, pressure sensor and vacuum valves.
Figure 11:
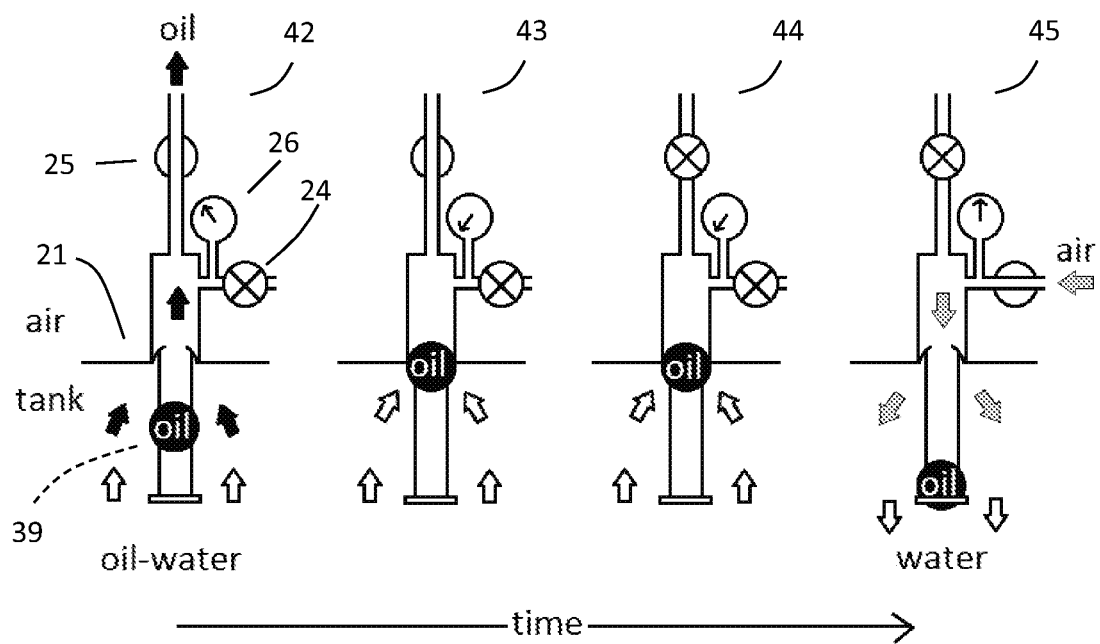
FIG. 11 depicts a time sequence showing a float ball valve vacuum switch of the disclosure in operation.

FIG. 10 shows a close up side view of the upper float ball valve and a buoyancy adjustable float ball 39, along with various elements including the upper float ball valve pipe 28 fitted with air inlet 24, vacuum valve 25, pressure sensor 26, couplers 29, and flexible vacuum hose 27. Top plate 12 is also shown for reference. The buoyancy adjustable float ball 39 is a hollow ball that can be filled and sealed with the fluid that one wishes to collect through oil outlet 8, and includes a reversibly sealable access port 41 through which the target fluid is added. The addition of a fluid to be recovered renders the float ball essentially neutrally buoyant in the fluid one wishes to recover. This later aspect is illustrated in FIG. 11. It will be appreciated that a range of stock float balls with different buoyancies can be employed, provided that they fit within the guide cage and are capable of reversibly and sealably engaging the associated float ball valve seat.

A time sequence is depicted in FIG. 11 showing a float ball valve vacuum switch of the disclosure as configured in a mixed density fluid separator of the disclosure in normal operation for lighter-than-water oil. At the first time point 42, a vacuum pump (not shown) attached to vacuum valve 25 draws fluid from inside the tank (the tank side) to outside the tank (air side) through float ball valve 21 until the float ball valve is closed by the rising oil-filled float ball 39 at the second time point (state 43). Specifically, time point 42 depicted in FIG. 11 shows air inlet valve 24 closed, while float ball valve 21 and vacuum valve 25 are open, and with pressure sensor 26 detecting a standard vacuum indicative of good fluid flow. In this condition the lighter oil fluid is drawn towards the vacuum and so long as the tank contains sufficient oil, the oil-filled float ball 39 will not engage and shut off the float ball valve. Time point 43 in FIG. 11 shows float ball valve 21 closed by float ball 39 due to a reduction in oil and rise of water in the tank, which causes the float ball to float on the water surface and rise with the water level; as the float ball rises, it eventually engages the float ball valve seat and causes the vacuum pressure or suction to increase significantly as fluid flow is blocked.

Time point 44 in FIG. 11 depicts what happens next in this time sequence, which is the closing of vacuum valve 25 once pressure sensor 26 detects an increase in vacuum connected to the shutting off of float ball valve 21. It can be seen at time point 44 that vacuum valve 25 and air inlet valve 24 are closed. It is possible hold at time point 44 so as to delay moving on to time point 45. For instance, in a dual separation tank system as shown in FIG. 1, a time delay of about 1-10 seconds, usually about 2-8 seconds, and more typically about 3-6 seconds to about 4 seconds at the valve setting depicted in FIG. 11 time point 44 allows fluids in that particular "vacuum locked" tank to settle more and separate before moving to the next step and then placing it back on an active vacuum setting for active fluid separation and removal.

For example, FIG. 11 at time point 45 depicts the last part of a typical cycle between valve setting (a) and valve setting (b) as described above for a mixed density fluid separator of the disclosure. As shown for time point 45, air inlet valve 24 is opened to dislodge float ball 39 from its valve seat by rapidly introducing air back into the tank where the pressure is extremely low due to vacuum so that the process can begin again if desired.

In addition to the buoyancy adjusted float ball and guide cage rail configuration and length, an important feature of the upper float ball valve system depicted in FIGS. 10 and 11 is that spacing of the air inlet and vacuum valve as shown provides a significant pressure differential force that can be exploited to dislodge the float ball from its associated valve seat when the air inlet is suddenly opened and air rushes into the tank. Another advantageous feature is that a vacuum can be maintained on the oil out line or hose attached to the vacuum valve throughout the entire process. This later aspect is very useful when long vacuum hoses are used. For instance, long flexible vacuum hoses are often employed due to distances between the vacuum pump and mixed density fluid separator (e.g., vacuum pump and collection containers on board a boat while the fluid separator tank(s) is deployed on a different flotation platform) (see, e.g., FIGS. 12 and 13). When long flexible vacuum hoses are use, it can take a significant amount of time for a sufficient vacuum to be created. So it becomes very useful to have the option of keeping the hose under a constant standard vacuum once the apparatus cycles from time point 42 to time point 45 depicted in FIG. 11.

Figure 12:
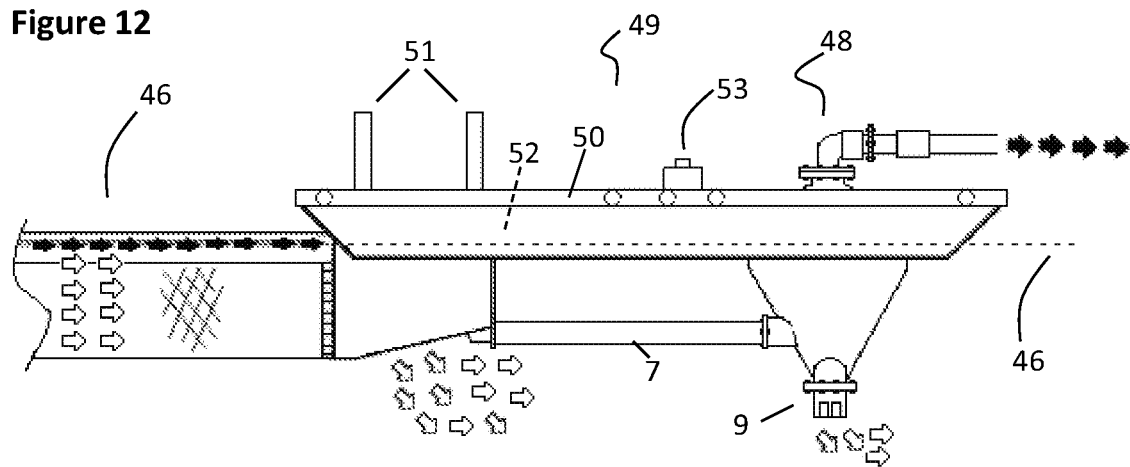
FIG. 12 depicts a side view of an advancing oil skimmer with forward sweep wings, a flotation platform and a mixed density fluid separator of the disclosure in normal operation.
Figure 13:
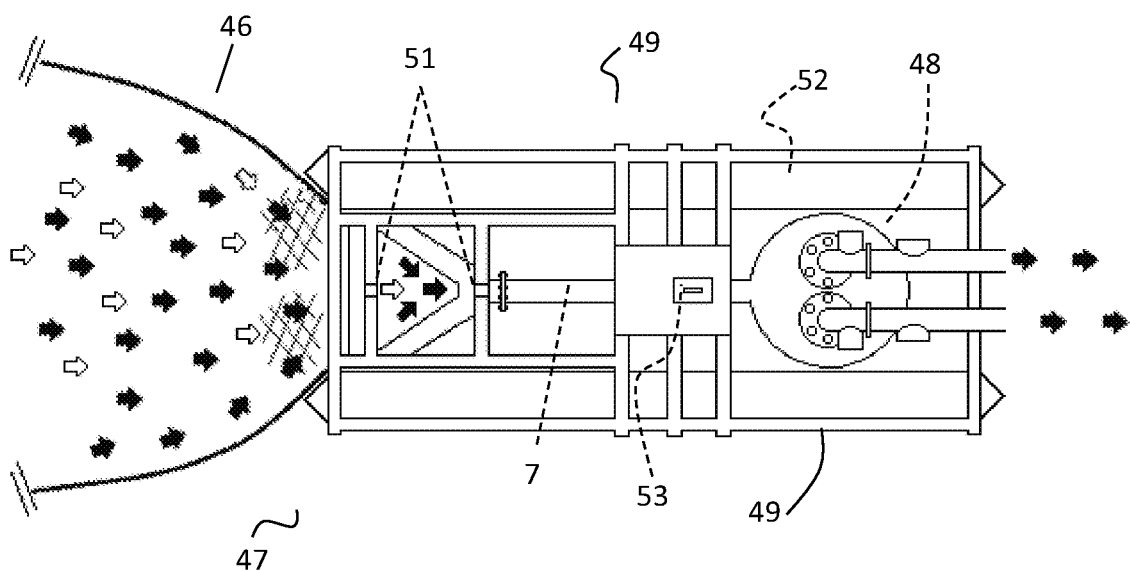
FIG. 13 depicts a top down view of the system in FIG. 12.
Figure 14:
FIG. 14 depicts an arrow pointing upstream (afore or forward), and the distal end of the arrow representing downstream (aft or aftward) relative to the advancing oil skimmers shown in FIGS. 12 and 13.

Referring to FIGS. 12-14, portions of a dual mixed density fluid separator of the disclosure fitted with for oil slick cleanup in an open body of water are shown. FIGS. 12-13 depicts various views of an advancing oil skimmer head attached to forward sweep wings, a flotation platform and an mixed density fluid separator of the disclosure in normal operation. As above, lighter-than-water contaminants such as oil are depicted by the black arrows (➡), the heavier fluids including water are depicted by the arrows with no fill (⇨). FIG. 12 depicts a side view. FIG. 13 depicts a top down view of the system in FIG. 12. FIG. 14 depicts an arrow pointing upstream (afore or forward), and the distal end of the arrow representing downstream (aft or aftward). A fluid stream is corralled and channeled by forward wings 46 from a body of water 47 into a skimmer head 54.

In this example, an advancing skimmer head is employed as disclosed in U.S. Provisional Application No. 62/351,437, filed of Jun. 17, 2016, which is hereby incorporated by reference. Briefly, the advancing skimmer head includes inner and outer skimmer heads each individually including: (i) a normally vertical mouth at a forward end having above and below waterline portions, feeding (ii) a horizontally narrowing internal channel converging aftward along a longitudinal axis of symmetry to an aftward end having above and below waterline portions, draining to (iii) a below waterline drain. The inner head is dimensionally sized and compactly vertically fitting within the outer head such that (i) the forward and aft ends of the inner and outer heads are in alignment along the longitudinal axis of symmetry so that the inner and outer head mouths are facing the same direction, and (ii) the inner head is sealably seated and vertically slidable within the outer head relative to waterline. In addition, the inner head drain discharges downwardly and aftwardly to a skimmer head oil-water outlet, the outer head drain discharging to the body of fluid aft of the outer head mouth. Lastly, the inner head is attached to the outer head through a vertical actuator to slide the inner head up and down within the outer head relative to waterline so as to place the inner head mouth in a position within an incoming fluid stream to collect the desired fluid layer therefrom.

As such, below waterline fluid is discharged aft of the mouth through a drain of the skimmer head and back into the body of water 47, while the oil slick 46 surface layer is diverted into oil-water main 7. Surface water collected by the advancing skimmer head is routed through a conduit connected through a coupler to oil-water main 7 which in turn feeds the mixed density fluid separator 48. In this example, the mixed density fluid separator 48 is a two tank continuous flow separator, as disclosed herein. The separator 48 processes the incoming oil-water surface mixture 46 so as to discharge excess water through water outlet 9, and the concentrated oil aftward to a collection tank (not shown).

A more detailed look at FIGS. 12 and 13 shows an exemplary flotation platform 49, with rigid platform frame 50 attached to rigid external outer head frame 51, oil-water separator 48, and pontoons 52. Note the wireless communication device 53 with battery for remotely controlling the vertical actuator. Also note the streamlined nature of the entire system for towed, self-propelled, and anchorable cleanup scenarios etc.

It is to be understood that various forward wing nets including oil boom can be attached to the skimmer head to corral, concentrate and feed the skimmer head and mixed density fluid separator. Not shown in FIGS. 12 and 13 are an aftward vacuum pump for applying vacuum to the oil outlet of each mixed density fluid separator tank. Also not shown is a vacuum trap for collecting and recovery product from the oil outlet. Various buoyancy systems (not shown) can also be employed to float and stabilize the apparatus relative to waterline.

Kits & Deployment Systems

Kits and deployment systems are provided that benefits by and/or finds use in practicing the subject methods, as described above. For example, kits and deployment systems that include a mixed density fluid separator for practicing the subject methods may comprise one or more additional components, such as booms, floats, wing nets, line, hose, pump, holding tanks or other reservoirs, skimmer heads and so forth. The kits may also include a system that includes disassembled and/or ready-to-use pre-assembled components. Of particular interest is a kit containing the mixed density fluid separator apparatus and other components for a deployable system illustrated in the Figures.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., a diskette, a CD, etc., on which the information has been recorded. Yet another means that may be present is a website address which may be used via the internet to access the information at a remote site. Any convenient means may be present in the kits.

The term "deployable system" as employed herein refers to a collection of components of a system of the disclosure, particularly as the mixed density fluid separator apparatus and systems are described herein and depicted in the Figures. Thus portions of the mixed density fluid separator apparatus that are brought together for the purpose of practicing the subject methods are included.

Utility and Advantages

The subject mixed density fluid separator, kits and methods find use in different applications, including removing contaminants from the water surface, sediment and the like. The subject disclosure has broad applicability for collecting floatable surface contaminants such as product slicks from ponds, streams, rivers, lakes, bays, open ocean and the like. It can also be used in shallow water environments for near shore skimming. This includes when deployed in conjunction with one or more vessels when under a tow force imparted by a vessel to feed contaminated water to the apparatus, as well as in anchored settings when fed by current, or in even in a tank or reservoir of fluid, for example, by placing the apparatus in a holding tank and advancing the system around.

As can be appreciated, the mixed density fluid separator of the present disclosure can be operated when placed in practically any liquid environment, whether the liquid is contaminated with oil or otherwise, in which it is desirable or useful. It can also be used to collect flotsam, plastics, garbage and other floating or slightly submerged debris. So while the mixed density fluid separator is particularly useful for skimming oil slicks in oil-spill scenarios, the apparatus can be adapted for multiple other applications, including, but not limited to, the processing of liquids not contaminated with oil. It also finds use in processing sediments and the like having fluid like features, for example, separating contaminants of oil covered sands, gravel, tar sands, and so forth from water and other solvents used to process them.

The subject mixed density fluid separator, kits and methods have several advantages. The attendant benefits are particularly apparent for removal of oil from the surface of water.

One advantage is that the mixed density fluid separator is capable of excellent product recovery efficiencies, e.g., recovering significantly more oil than water, even in choppy water environments. Another is that very good collection rates are possible through advancing the apparatus in a continuous manner.

The mixed density fluid separator is also very durable and able to withstand heavy duty applications, including when deployed in the choppy waters. For example, the rugged nature and high processing capabilities permit the apparatus to be deployed with various forward wing systems, such as oil spill containment booms, wing nets and the like, including net systems such as disclosed in U.S. Pat. No. 9,068,313, as well standard near shore two foot deep floating vinyl-coated oil containment booms, and combinations thereof. Moreover, each component in and of itself is easily replaced if damaged, and is relatively inexpensive and straightforward to produce. Also, the size of the forward containment wing portion can be readily expanded by adding additional panels for larger sweeps.

Another advantage of the present mixed density fluid separator is that it can be readily adapted for use as a rapid response oil recovery system. For example, a portable kit with the mixed density fluid separator and mixed density fluid separator platform as illustrated in the figures can be readily fit into standard commercial "fish totes." This "fish tote size oil recovery system" also works with many off-the-shelf boom systems. This makes possible rapid deployment in remote locations where access to ports is limited or altogether absent, with a very low upfront response cost.

As such, the subject disclosure finds use in a variety of different applications and represents a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

While preferred and alternate embodiments of the invention have been illustrated and described, as noted above, many changes can be made without departing from the spirit and scope of the appended claims. Accordingly, the scope of the invention is not limited by the disclosure of these preferred and alternate embodiments.

What is claimed is:

1. A fluid separator for separating fluids of different density, such as oil and water, comprising:
 (i) a fluid separation tank having upper and lower portions relative to waterline defining a substantially sealed enclosure for containing a fluid therein;

(ii) an oil-water main feeding the tank through an oil water inlet so as to define an oil-water flow path from outside to inside the tank;

(iii) a water outlet in the lower portion of the tank so as to define an water flow path from inside to outside the tank;

(iv) an air inlet in gaseous communication with the upper portion of the tank so as to define an air flow path from outside to inside the tank;

(v) an oil outlet in the upper portion of the tank so as to define an oil flow path from inside the tank to outside the tank; and (vi) a valve system for regulating the oil-water flow path, the water flow path, the air flow path, and the oil flow path, the valve system having first and second valve settings:

the first valve setting (a) to open the oil-water flow path of the oil-water inlet and the oil flow path of the oil outlet, and to close the air flow path of the air inlet and the water flow path of the water outlet, and the second valve setting (b) to close the oil-water flow path of the oil-water inlet and the oil flow path of the oil outlet, and to open the air flow path of the air inlet and the water flow path of the water outlet;

wherein the oil flow path is regulated in part by an upper float ball valve to direct flow of a first fluid out of the tank when open and prevent backflow when closed, the upper float ball valve positioned in the upper portion of the tank and comprising as components:

an upper float ball slideably retained by a vertically elongated upper guide cage relative to waterline, the upper float ball selected to be neutrally to negatively buoyant in a fluid to be discharged outside the tank from the oil outlet, and positively buoyant in a fluid to be discharged outside the tank from the water outlet, and the upper guide cage having guide rails arranged to define a float ball movement path having a portion that is fully exposed on all sides to surrounding fluid within the tank and substantially impediment free except for guide rail contacts, the fully exposed portion of the upper guide cage at least two times as long as the diameter of the upper float ball.

2. The mixed density fluid separator of claim 1, wherein the upper float ball is a buoyancy adjustable float ball.

3. The mixed density fluid separator of claim 1, wherein the fully exposed portion of the upper guide cage is at least three times as long as the diameter of the upper float ball.

4. The mixed density fluid separator of claim 1, wherein the fluid to be discharged outside the tank from the oil outlet is less dense than water.

5. The mixed density fluid separator of claim 4, wherein the fluid to be discharged outside the tank from the oil outlet is oil.

6. The mixed density fluid separator of claim 4, wherein t the fluid to be discharged outside the tank from the water outlet comprises water and sediment.

7. The mixed density fluid separator of claim 1, wherein the upper float ball valve is sealably adjoined to and feeds a valve pipe adapted for connection to a vacuum pump, the valve pipe fitted with an air inlet valve and a vacuum valve, the air inlet valve for regulating the application of air to the valve pipe, and the vacuum valve for regulating the application of vacuum to the valve pipe.

8. The mixed density fluid separator of claim 7, wherein the air inlet valve is positioned between the upper float ball valve and the vacuum valve.

9. The mixed density fluid separator of claim 7, wherein the valve pipe includes a pressure sensor to detect pressure in the valve pipe.

10. The mixed density fluid separator of claim 7, wherein the mixed density fluid separator includes a computer for controlling the valve settings, and includes a setting for regulating the opening and closing of the air inlet valve and the vacuum valve.

11. The mixed density fluid separator of claim 10, wherein the computer includes a setting to delay the opening of the air inlet valve when the vacuum valve is closed.

12. The mixed density fluid separator of claim 1, wherein the oil-water main discharges into an upper portion of the fluid separation tank.

13. The mixed density fluid separator of claim 1, wherein the mixed density fluid separator comprises at least two of said fluid separation tanks for operating in parallel, and wherein the oil-water main feeds an oil-water manifold having a first distribution branch feeding the first fluid separation tank, and a second distribution branch feeding the second fluid separation tank.

14. A method of separating fluids with different densities, such as an oil slick from the surface of a body of water, the method comprising:

supplying a mixed density fluid stream to the oil-water main of the mixed density fluid separator according to claim 1, the separator in fluid communication through the oil outlet with a pump, the pump supplying a partial vacuum to the oil outlet; and alternating between valve settings (a) and (b).

15. A kit for rapid deployment and oil-spill recovery, the kit comprising the mixed density fluid separator according to claim 1 stored in a transportable container, and optionally, one or more unassembled accessory components selected from the group consisting of oil boom, wing net, line, hose, vacuum pump, flotation platform, skimmer head, and oil recovery tank.

* * * * *